United States Patent
Elsetinow et al.

(10) Patent No.: US 7,153,541 B2
(45) Date of Patent: Dec. 26, 2006

(54) METHOD FOR INHIBITING OXIDATION OF METAL SULFIDE-CONTAINING MATERIAL

(76) Inventors: Alicia Elsetinow, 218 E. Benezet St., Philadelphia, PA (US) 19118; Michael J. Borda, 77 Jefferson Ave., Saint James, NY (US) 11780; Martin A. Schoonen, 34 Central Ave., Miller Place, NY (US) 11764; Daniel R. Strongin, 718 Greythorne Rd., Wynnewood, PA (US) 19096

( * ) Notice: Subject to any disclaimer, the term of this patent is extended or adjusted under 35 U.S.C. 154(b) by 241 days.

(21) Appl. No.: 10/497,769

(22) PCT Filed: Dec. 4, 2002

(86) PCT No.: PCT/US02/38630

§ 371 (c)(1),
(2), (4) Date: Oct. 8, 2004

(87) PCT Pub. No.: WO03/047768

PCT Pub. Date: Jun. 12, 2003

(65) Prior Publication Data

US 2005/0036930 A1    Feb. 17, 2005

Related U.S. Application Data

(60) Provisional application No. 60/337,306, filed on Dec. 4, 2001.

(51) Int. Cl.
*B05D 7/00* (2006.01)
*C01G 49/00* (2006.01)
*C09K 15/00* (2006.01)
*C09K 15/04* (2006.01)

(52) U.S. Cl. .................. 427/212; 427/213.3; 427/220; 106/14.05; 106/243; 210/747; 210/198.1; 252/380; 252/384; 252/397; 252/399; 299/10; 423/561.1; 423/566.1; 428/357

(58) Field of Classification Search ............. 423/561.1, 423/566.1; 252/380, 384, 397, 399; 106/14.05, 106/243; 299/10; 427/212, 213.3, 220; 428/357; 210/747, 198.1

See application file for complete search history.

(56) References Cited

U.S. PATENT DOCUMENTS

| | | | |
|---|---|---|---|
| 4,427,448 A | 1/1984 | Hedlund et al. | |
| 5,091,112 A | 2/1992 | Perozzi et al. | |
| 5,550,141 A | * 8/1996 | Gould et al. | ................. 514/363 |
| 6,063,347 A | 5/2000 | Roling et al. | |
| 6,196,765 B1 | * 3/2001 | Harrington | ............. 405/128.45 |

* cited by examiner

*Primary Examiner*—Timothy C. Vanoy
(74) *Attorney, Agent, or Firm*—Dilworth & Barrese, LLP

(57) ABSTRACT

The present invention provides means for inhibiting the oxidation of a metal sulfide-containing material, such as ore mine waste rock or metal sulfide tailings, by coating the metal sulfide-containing material with an oxidation-inhibiting two-tail lipid coating (12) thereon, thereby inhibiting oxidation of the metal sulfide-containing material in acid mine drainage conditions. The lipids may be selected from phospholipids, sphingolipids, glycolipids and combinations thereof.

30 Claims, 5 Drawing Sheets

METHOD FOR INHIBITING OXIDATION OF METAL SULFIDE-CONTAINING MATERIAL

CROSS REFERENCE TO RELATED APPLICATIONS

This application claims priority to Provisional Application Ser. No. 60/337,306, filed Dec. 4, 2001, the contents of which are incorporated by reference herein.

STATEMENT OF GOVERNMENTAL INTEREST

This invention was made with Government support under grant DEFG0296ER14644 and DEFG029ER14633 awarded by the Department of Energy-Basic Energy Sciences.

BACKGROUND OF THE INVENTION

1. Technical Field

This invention generally relates to methods for inhibiting the oxidation of metal sulfide-containing material to reduce the amount of acid mine drainage (i.e., acidic wastewater) produced in mining and mineral processing operations and to metal sulfide-containing material having thereon an oxidation inhibiting lipid coating comprised of a lipid composition containing at least one or more lipid compounds having hydrophilic head groups and two of the same or different organic hydrophobic groups attached to each of the hydrophilic head groups dispensed in an aqueous medium.

2. Description of Related Art

There is considerable interest in the development of methods to reduce the amount of metal sulfide oxidation during mining and milling operations. Presently, the production of acidic drainage from reactive sulfide tailings and waste rock deposition produced during mining and milling of sulfide-containing ores is a major environmental and ecological problem. This is known as acid mine drainage (AMD) which is the phenomenon of acid production from mining tailings and frequently contains toxic metals. It results from the mining of coal and other metal sulfide-containing materials, e.g., metal sulfide-containing rock. Metal sulfide-containing rocks are commonly mined for their content of precious metals (e.g., platinum, gold, and silver) and base metals (zinc, lead, copper). Both working and defunct mines have AMD problems associated with them. AMD is a major environmental problem since a significant amount of the waterways such as rivers, streams and lakes are either adjacent to, or in close proximity to, the affected mining site.

In general, AMD is produced when the metal sulfide minerals, e.g., pyrite ($FeS_2$), and ferric iron are exposed to the atmosphere. Upon contact with oxygen and water, the metal sulfide minerals undergo oxidation. This oxidation produces highly acidic water enriched with various heavy metals. For example, pyrite has a significant concentration in coal and ore mine waste rock such that upon oxidation the oxidized pyrite produces ferrous sulfate and sulfuric acid by a complex series of chemical reactions. This, in turn, results in the acidification of surface water (through the formation of sulfuric acid) and subsequent mobilization of toxic metals initially incorporated into the pyrite structure.

The high acidity and presence of toxic metals in AMD-containing waters degrade soil, air and water quality while also detrimentally impacting vegetation and aquatic life. Consequently, mine wastewaters, prior to being released into the environment, must be treated to meet government standards for the amount of metal and non-metal ions contained in the water. Some of these metals such as, for example, uranium and selenium, cause deleterious health effects and are extremely difficult to remove from mine wastewaters.

Past efforts to treat mine wastewaters have been ineffective or prohibitively expensive. When treatments are ineffective at removing some metal and non-metal ions, mining throughput can be restricted by governmental regulation. On the other hand, because other treatments are expensive, no cleanup has occurred in many cases, particularly for abandoned mines. Accordingly, up until the development of the present invention, there has been no reliable, long term, economic solution to reduce or prevent oxidation of metal sulfides such as pyrite that result in AMD.

One approach to preventing or controlling oxidation and therefore limit AMD was to encapsulate the pyrite mineral with a surface precipitate, such as iron phosphate or silica precipitates, designed to form a physical barrier for oxidants approaching its surface (See, e.g., Evangelou, V. P., "Potential microencapsulation of pyrite by artificial inducement of ferric phosphate coatings", J. Environ. Qual., Vol. 24, pp. 535–542 (1995); and Zhang et al., "Formation of ferric hydroxide-silica coatings on pyrite and its oxidation behavior", Soil Science, Vol. 163 (1), pp. 53–62 (1998)). Another approach was to complex aqueous $Fe^{3+}$, since this species together with aqueous $O_2$ has been shown to strongly oxidize pyrite (See, e.g., Singer et al., "Acidic mine drainage: The rate-determining step", Science, Vol. 167, pp. 1121–1123 (1970)). Humic acid and other organic ligands, some leached from wood chips and manure, have been explored in this context (See, e.g., Lalvani et al., "Coal pyrite passivation due to humic acids and lignin treatment", Fuel Science and Technology Int'l., Vol. 14(9), pp. 1291–1313 (1996); and Peiffer et al, "The oxidation of pyrite at pH 7 in the presence of reducing and nonreducing Fe (III)-chelators", Geochimica et Cosmochimica Acta, Vol. 63, pp. 3171–3182 (1999); and Backes et al., "Studies on the oxidation of pyrite in colliery spoil II. Inhibition of the oxidation by amendment treatments", Reclamation and Revegetation Research, Vol. 6, pp. 1–11 (1987)).

At least one problem with these approaches has been that at low pH the encapsulation or complexation approaches generally do not work well, because the protecting phase becomes soluble and is not stable for long times. In some cases, especially in the phosphate case, the approach itself is harmful to the environment and would pose additional problems in their use if the pH were to drop. For example, phosphate is known to be a primary cause of eutrophication in streams and particularly in ponds and lakes. Additionally, the phosphate coating on the iron sulfide has been found to be stable only at higher pH values, i.e., pH values greater than 4.0 (See, e.g., Elsetinow et al., "Aqueous geochemical and surface science investigation of the effect of phosphate on pyrite oxidation", Environmental Science and Technology, Vol. 35, pp. 2252–2257 (2001)). However, at low pH values such as those in the range of a pH of about 2.5–4.0 that are prevalent in mining locations and spoil areas lead to a breakdown of the phosphate coating within about fifty days. Accordingly, unless the mining location and spoil area are periodically treated (e.g. about every thirty days) with limestone or other alkaline material to control pH and maintain the pH level between a pH of about 6 to about 8, the coating degrades and exposes the iron sulfide to oxidation. This, of course, leads to the gradual development of the acid solutions enriched with heavy metals that it hoped to avoid. Limestone buffering has also been shown to lead to increased pyrite oxidation (see, e.g., Evangelou et al., "Potential role of bicarbonate during pyrite oxidation", Environmental Science and Technology, Vol. 32, pp. 2084–2091 (1998)).

It would therefore be desirable to provide a method for inhibiting the oxidation of metal sulfide-containing material to prevent or reduce the formation of AMD, which possesses a long term effect and is also stable at low pH values.

SUMMARY OF THE INVENTION

It is an object of the present invention to provide a method for treating metal sulfide-containing material in order to reduce and control oxidation. and the production of acid solutions enriched with heavy metals.

It is another object of the present invention to provide a method for inhibiting the oxidation of metal sulfide-containing material employing an oxidation-inhibiting lipid coating comprising a two tail lipid, which is characterized by two hydrophobic tails (i.e., two-tail lipid) attached to a hydrophilic head group, dispensed in an aqueous medium.

It is a further object of the present invention to provide a method to prevent acid mine drainage from initially occurring and/or to treat existing acid mine drainage.

Yet a further object of the present invention is to provide a metal sulfide-containing material having an oxidation-inhibiting lipid coating thereon, the lipid coating comprising a lipid composition comprising one or more two-tail lipids in an aqueous medium, and which is stable and long lasting even in the presence of an acid environment thereby significantly reducing or eliminating this environmental problem by serving as an oxidation retardant in acid mine drainage conditions.

Yet another object of the present invention is to provide a relatively economical and efficient method for treating mine tailings and waste products from ore purification processes so as to reduce or substantially eliminate the oxidation of metal sulfide-containing material such as pyrite contained in those waste products.

Advantageously, as the resulting oxidation-inhibiting two-tail lipid coating is stable and long lasting, these waste products may then be safely disposed of in the environment without the need for expensive physical encapsulation processes including the construction of clay, plastic or blacktop liners. This is because the oxidation-inhibiting two-tail lipid coating adopts a structure on the surface that substantially prevents the contact of oxygen and water with the metal sulfide-containing material. Thus, the production of acid solutions enriched with heavy metals from oxidation of metal sulfide-containing material is substantially eliminated.

Still another object of the invention is to provide a method of coating metal sulfide-containing material such as pyrite in situ to minimize environmental damage from oxidation and reduce the chances of spontaneous combustion of coal reserves resulting from heat produced during framboidal pyrite oxidation. Advantageously, the oxidation-inhibiting two-tail lipid coating employed in the present method is acid resistant and can withstand pH values as low as about 1 to about 4 that is, pH ranges prevalent in soils around mining sites and spoils. Thus, it should be appreciated that the oxidation-inhibiting lipid coating on the metal sulfide is stable and prevents oxidation over time without the need to monitor, adjust and maintain a neutral pH in these areas. As such, the present method presents the first economically feasible, long-term solution to the problem of metal sulfide oxidation.

In keeping with these and other objects of the present invention, it has surprisingly been discovered that a two tail lipid compound(s) dispensed in an aqueous medium are highly effective when employed as coatings on metal sulfide-containing material to inhibit the production of and/or treating of existing AMD by blocking the oxidation of disulfide to sulfate while also being stable at low pH levels and at high temperatures, e.g., a temperature of about 35° C. In this manner, the two tail lipid coatings are able to withstand the harsh environments of AMD.

Accordingly, a method for inhibiting the oxidation of metal sulfide-containing material is provided which comprises the step of contacting the metal sulfide-containing material with an effective amount of an oxidation-inhibiting lipid coating comprising a lipid composition comprising one or more lipid compounds having hydrophilic head groups and two of the same or different organic hydrophobic groups attached to each of the hydrophilic head groups dispensed in an aqueous medium to inhibit oxidation of the metal sulfide-containing material.

The expression "attached to" as used herein with reference to the hydrophilic head groups having two of the same or different hydrophobic tails attached to each of the hydrophilic head groups shall be understood to mean that the hydrophobic tails can be directly bonded to the head group or can be indirectly bonded to the head group by, for example, each of the hydrophobic tails being bonded directly to the same linking group or different linking groups such as, for example, an ether or ester group, and the linking group is bonded to the head group.

BRIEF DESCRIPTION OF THE DRAWINGS

The accompanying drawings incorporated in and forming a part of the specification, illustrates several aspects of the present invention and together with the description serves to explain the principles of the invention. The drawings are described as follows.

DETAILED DESCRIPTION OF THE PREFERRED EMBODIMENTS

As indicated above, the present methods herein employ an oxidation-inhibiting coating comprising a two tail lipid composition on metal sulfide-containing material. The metal sulfide-containing material herein typically contain such metal suffides as, for example, pyrite, marcasite ($FeS_2$), galena (PbS), Sphalerite (ZnS), arsenopyrite (FeAsS), and Cu—Fe—S phases common in ore material. Such metal sulfides may be found in such metal sulfide-containing material as earth strata, rocks, mine tailings, gob piles, waste products from ore purification processes and the like. Unfortunately, the safe environmental disposal of these materials is difficult as oxygen and water in the environment oxidize the metal sulfides and produce, e.g., sulfuric acid solutions that are enriched with heavy metals.

The present invention efficiently and effectively addresses this problem by providing a stable and long lasting two tail lipid coating over the metal sulfide-containing material that substantially prevents the oxidation reaction from occurring. Advantageously this desired result is achieved using inexpensive environmentally safe and friendly two tail lipid compounds. Additionally, the resulting two tail lipid coating is stable in the acid environment characteristic of mining sites or spoil materials, e.g., at a pH below about 4.0 and preferably between about 1 to about 4.

In order to inhibit the oxidation of metal sulfide-containing material, and effectively treat AMD, the metal sulfide-containing material is contacted with an effective amount of an oxidation-inhibiting lipid coating containing at least a two tail lipid composition comprising one or more lipid compounds having a hydrophilic head group and two of the same or different organic hydrophobic groups attached to the hydrophilic head group dispensed in an aqueous medium to inhibit the oxidation of the metal sulfide-containing material. By dispensing one or more lipid compounds containing hydrophilic head groups and two of the same or different organic hydrophobic groups attached to each of the head groups in an aqueous medium, e.g., water, the lipid compounds advantageously form an oxidation inhibiting lipid coating.

Figure 1:
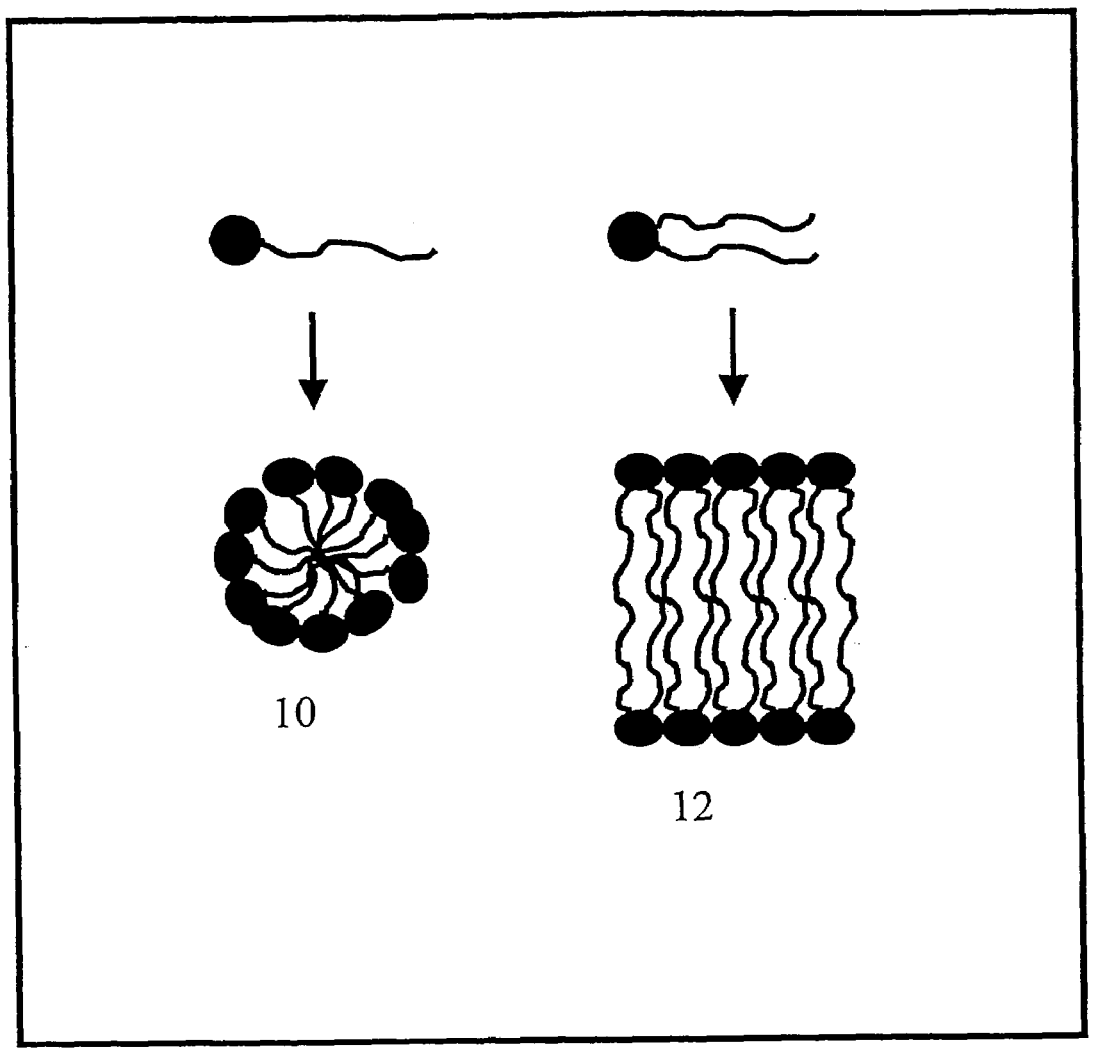
FIG. 1 is a schematic diagram of the solution structure adopted by a lipid compound containing a single hydrophobic tail (micelle) and a schematic diagram of the solution structure of a two tail lipid compound containing two hydrophobic tails (bilayer).

While not wishing to be bound by theory, it is believed that the mechanism by which the two tail lipid coating impede oxidation of the metal sulfide-containing material is as follows: Upon hydration, two tail lipid compounds spontaneously form structures in an aqueous solution that allow the interaction of their polar head with the solution and the isolation of the hydrophobic tails from the solution. The structure that is formed by the two tail lipid compound after introduction into the solvating phase depends, to a large degree, on the composition of the lipid tail. Specifically, and as shown in FIG. 1, a lipid compound containing one hydrophobic tail in an aqueous medium form micelles 10, while a lipid compound containing two hydrophobic tails in an a bilayer structure 12.

Figure 2:
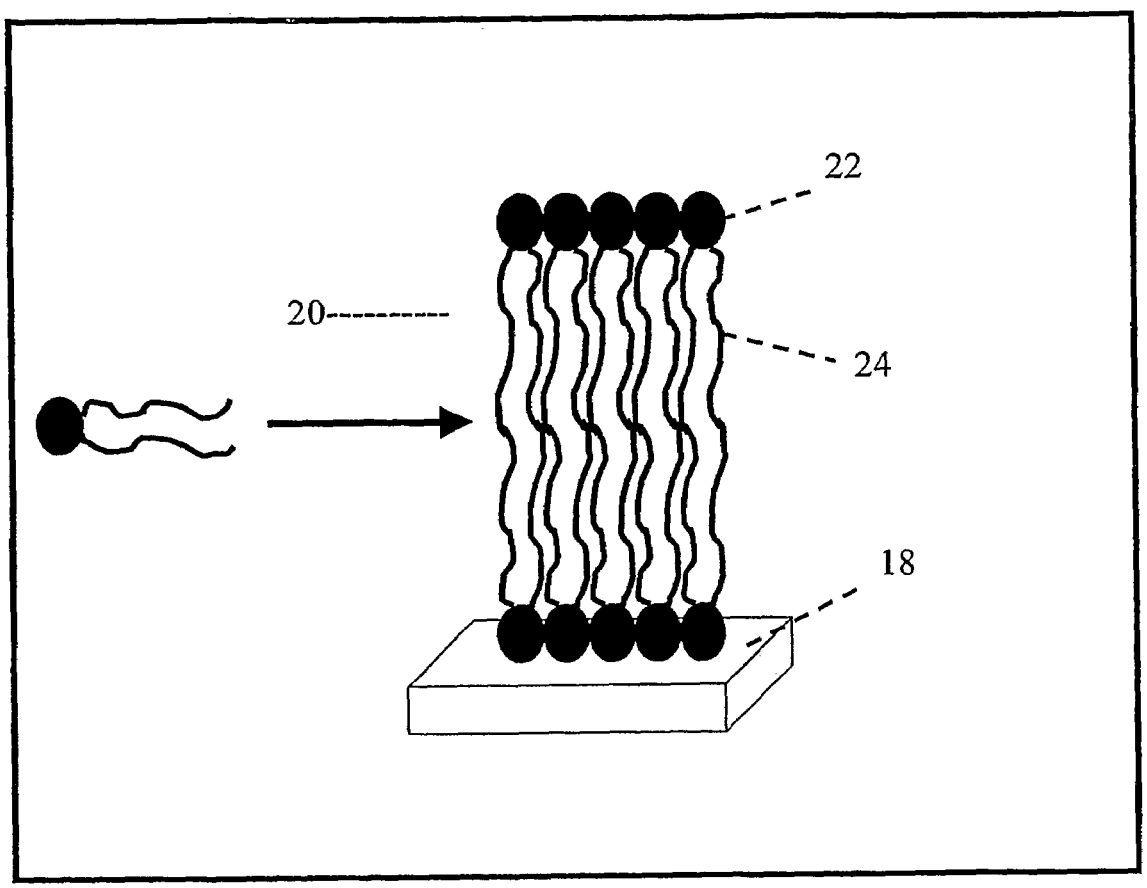
FIG. 2 is an illustration of the proposed structural model of the two-tail lipid coating on a metal sulfide-containing material.

It is further believed that the lipid compounds containing two tails form bilayers because the adoption of this structure allows the rectangular-like tail-structure to prevent the formation of water pockets between their hydrophobic tails. In this manner when the two tail lipid composition is contacted with the metal sulfide-containing material such that the head groups of the two tail lipid compound in the composition interact at the surface of the metal sulfide-containing material to act as an oxidation inhibiting coating upon exposure to water and oxygen and substantially prevent any initial or further oxidation of the metal sulfide-containing material. This can be better understood as shown in FIG. 2 where the two tail lipid coating 20 is contacted with metal sulfide-containing material 18 such that the lipid coating 20 interacts at the surface of metal sulfide-containing material 18 by way of interaction of the head groups 22, while the two tail hydrophobic core 24 repels water and the hydrophilic head groups 22, above the core, would help to stabilize the adsorbed lipid in solution. It is suspected therefore that the adsorbed two tail lipid compound in an aqueous medium adopts a bilayer structure.

The lipid compounds useful herein include any known lipid compound having at least a hydrophilic head group and two of the same or different organic hydrophobic groups attached to the hydrophilic head group. Representative of these types of lipids are illustrated in Voet & Voet, Biochemistry, Chapter 11—Lipids and Membranes, pp. 277–290 (1995), the contents of which are incorporated by reference herein. Such lipids can either form spontaneously into bilayers in water, as exemplified by the phospholipids, or are stably incorporated into lipid bilayers, with its hydrophobic moiety in contact with the interior, hydrophobic region of the bilayer membrane, and its head group moiety oriented toward the exterior. Generally, the hydrophilic head groups of the two-tail lipid compound include, but are not limited to, phosphate ($-PO_4^{2-}$, or $-PO_4^-$ as a linking group), phosphoryl ($-PO_3^{2-}$), sulfate ($-SO_4^{2-}$), amino ($-NH_2$ or $-NH_3^+$), amines (primary, secondary, or tertiary), carboxylate ($-CO_2^-$), hydroxyl ($-OH^-$), carbonyl, or acyl functional groups and the like and combinations thereof The hydrophobic tails can be the same or different and are hydrocarbon chains. Suitable hydrocarbon chains include those that are saturated or those having varying degrees of unsaturation and include, for example, an alkyl, an alicyclic or an alkylalicyclic group having from about 10 to about 24 carbon atoms or an alkylaryl where the alkyl group is from about 10 to about 24 carbon atoms, including, by way of illustration, unsubstituted straight or branched aliphatic, cycloaliphatic and aromatic groups and cycloaliphatic and aromatic groups substituted with one or more straight or branched aliphatic, cycloaliphatic and/or aromatic groups.

There are a variety of synthetic and naturally occuring lipids, including the phospholipids, e.g., phosphatidylcholine, phosphatidylethanolamine, phosphatidic acid, phosphatidylinositol, and sphingomyelin, where the two hydrocarbon chains are typically between about 10–24 carbon atoms in length, and have varying degrees of saturation. The above-described lipids and phospholipids whose chains have varying degrees of saturation can be obtained commercially or prepared according to published methods. Other suitable lipids include sphingolipids and glycolipids. Preferred lipids for use herein include, but are not limited to, diacyl glycerol, phosphatidyl ethanolamine (PE), diacylaminopropanediols, such as disteroylaminopropanediol (DS), phosphatidylglycerol (PG) and distearyl phosphatidylcholine (DSPC), Egg Sphingomyelin, 1,2-Dipalmitoyl-SN-Glycero-3-[Phospho-L-Serine] (16:0 PS) 1,2,-Dimyristoyl-SN-Glycero-3-[Phospho-RAC-(1-Glycerol)] (16:0 DGS), 1,2-bis(10,12-tricosadiynoyl)-SN-Glycero-3-Phosphocholine (23:2 Diyne PC), 1,2-Di-O-Octadecyl-SN-Glycero-3-Phosphocholine (18:0 Diether PC) and the like.

The two tail lipid compounds available as solids can be reduced to powder form by any means known to those skilled in the art. The lipid compounds used herein, whether liquid or solid, are preferably suspended, dispersed, or dissolved into an aqueous solution (e.g., water) to form the lipid composition employed herein as the oxidation-inhibiting lipid coating. The coatings can then be brought into contact directly with the source of the AMD, i.e., the metal sulfide-containing material, or with the AMD waters. Preferably, the two tail lipid compounds are first dispersed, suspended, or dissolved into water to form the lipid coatings of the present invention and then contacted with the source of the AMD and/or added to an area to be treated (e.g., AMD waters).

The lipid coatings of the present invention can be contacted with the source of the AMD or to the area to be treated by any known means of applying a solution including, but not limited to, spraying and pouring. In working with powdered or granular waste, it is preferable to add the two tail lipid to a water slurry of the waste. This improves contact and dispersion of the lipid compound(s) among the waste. Preferably, an effective amount of the two tail lipid compound(s) are suspended, dispersed, and/or dissolved in the aqueous solution so that a concentration of from about 30 μmolar to about 30 milimolar of the lipid compounds are present in the aqueous solution to form the lipid composition to be employed as the oxidation inhibiting lipid coatings of the present invention.

Generally, an effective amount of the coating of the present invention to be added to the source of the AMD and/or the AMD waters or other aqueous sources is an amount sufficient to interact with all reactive sites of the metal sulfide compounds in the metal sulfide-containing material. As such, the amount of the coating to be applied directly to the source of AMD or the area in need of treatment will vary widely. Regarding the treatment of the source of AMD, an amount should be used that is sufficient to prevent AMD from occurring through precipitation reactions. Preferably, at least about 250 ml of the aqueous solution of the two tail lipid composition is added per liter of AMD water to be treated in order to achieve the desired treatment that is preventing further AMD and inhibiting the oxidation of the metal sulfides. More preferably, a 1:1 ratio of aqueous solution to AMD water is used. Depending on the compositions used, this value can significantly vary. Similar amounts can be employed in treating the source of AMD (e.g., mine waste rocks such as pyrite). Accordingly, in preventing AMD from occurring or stopping any existing AMD, the coatings of the present invention, preferably in aqueous solution, are added to the AMD waters, as well as the source of the AMD, such as the metal sulfides in the mined waste rocks. This will effectively inhibit the oxidation of the metal sulfides as well as treat any existing AMD.

After coating the metal sulfide-containing material with the two tail lipid coating in the manner described, environmentally acceptable disposal of this waste product is made possible through stabilization. Specifically, for as long as the coating remains sound and it does so even in the acid environment characteristic of mining sites and spoil compounds, oxidation of the metal sulfide-containing materials by atmospheric oxygen and water is substantially prevented. As a result, the acid drainage and heavy metal pollution problems are virtually eliminated.

As discussed above, and as one skilled in the art would readily appreciate, the metal sulfide-containing material, i.e., the source of the AMD such as pyrite and marcasite, may also be coated by the present method in situ. More specifically, applying to the metal sulfide-containing material an effective amount as described above of the lipid coating described including at least water and a two tail lipid compound does this. Advantageously, the resulting lipid coating of the metal sulfide-containing material in situ reduces or prevents the oxidation process from occurring thereby reducing or preventing the production of acid solutions enriched with heavy metals.

This process can also be used in waters other than AMD waters such as any aqueous source containing a metal sulfide in which oxidation reduction is desired.

The following non-limiting examples are illustrative of the present invention.

EXAMPLES 1–7 AND COMPARATIVE EXAMPLES A AND B

Figure 3:
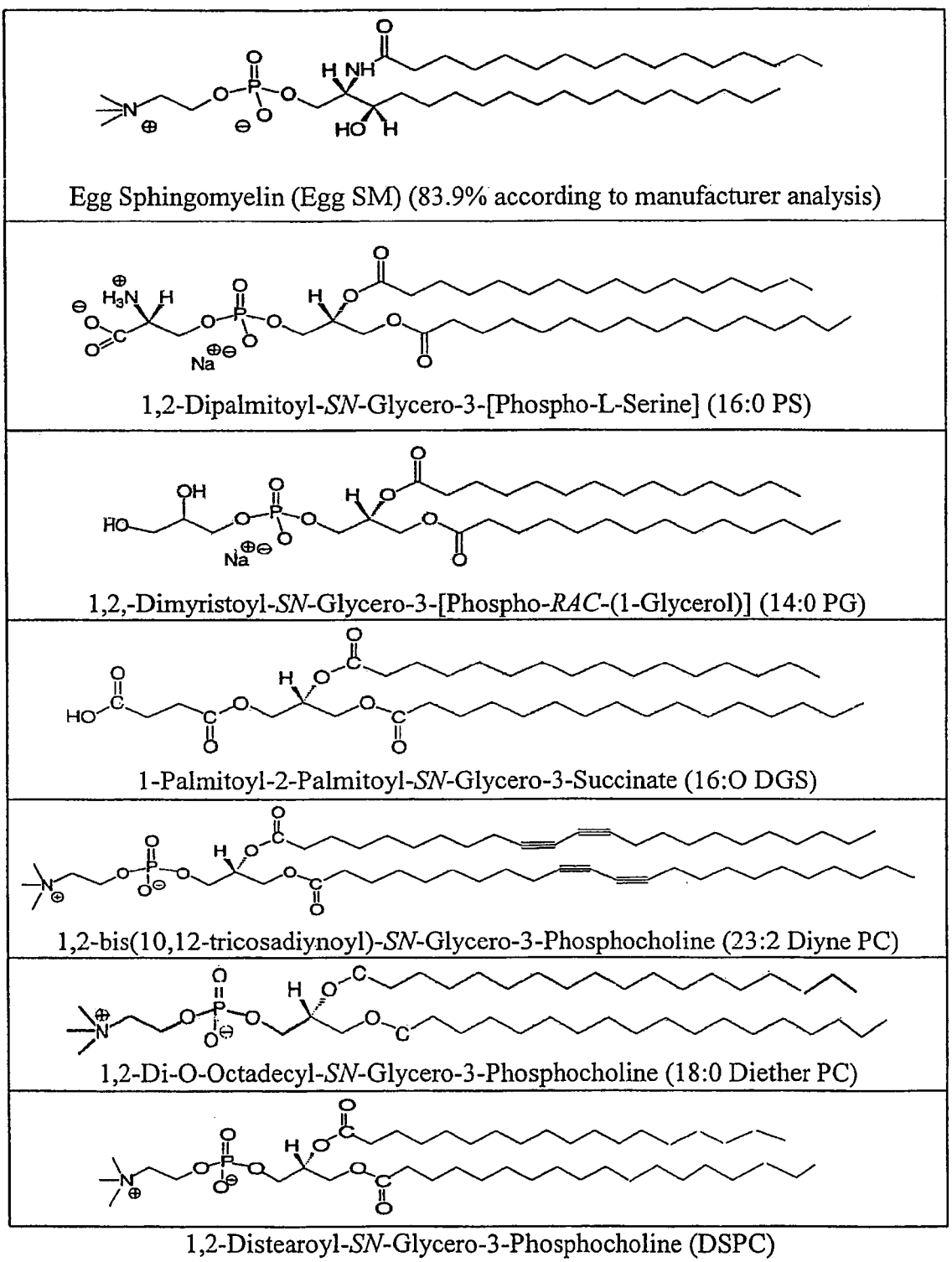
FIG. 3 shows the structures of the two-tail lipid compounds used in the examples. The lipids are characterized by the presence of two organic hydrophobic tails and a polar (electrophilic) head group. The lipids used in the examples vary in the nature of the electrophilic head group and linking group (ester or ether).

A variety of two-tail lipids varying in elemental composition and structure, and shown in FIG. 3 were obtained in powder form from Avanti Polar Lipids (Alabaster, Ala., USA). 30 μmoles of each lipid was added to 3 mL of deionized water at a temperature maximum of 333 K. Typical, lipid hydration procedures in the literature use lower temperatures, but also include an organic solvent such as chloroform. We favored the higher temperature to solvate as much of the lipids as possible. The solubility of the lipids in water, however, ranges from slightly soluble to insoluble, due to the hydrophobicity of the organic lipid tails. Nevertheless, the addition of any organic solvent was avoided since the use of chloroform would not be practical for environmental purposes, making the procedure more practical for any potential remediation application. However, the use of an environmentally safe organic solvent is still contemplated herein.

Stearic acid [$CH_3(CH_2)_{16}COOH$], a single-tailed and non-bilayer forming lipid, was used for comparison purposes and underwent the identical preparation procedure as the bilayer-forming lipids. Specifically, 30 μmol of stearic acid was added to 3 mL of deionized water at a temperature of approximately 333 K.

All of the pyrite samples used in examples were crushed samples that were subsequently acid washed by flowing pH 2 water over the mineral to remove any oxide coating on the pyrite and also to eliminate any initial differences in the different pyrite samples prior to the oxidation rate experiments. X-ray photoelectron spectroscopy (XPS) measurements of these acid-washed samples showed minimal oxygen and carbon contamination (typically, below 5% of a monolayer). For each example, 0.4 g of acid washed, crushed pyrite from Huanzala, Peru was used. After the pyrite was acid washed, the pyrite was contacted with the lipid. The pyrite/lipid suspension was mixed for 10 minutes and then transferred into 100 mL of pH 2 deionized water. The control experiment, to which the lipid/pyrite oxidation rate results were compared, consisted of 0.4 g of acid washed pyrite in the 100 mL of pH 2 deionized water. Each pyrite mixture was continuously stirred over a four-day period with 1 mL aliquots withdrawn during day one and day four. Aliquots were filtered using membrane filters with a nominal pore size of 0.45 mm and subsequently monitored for iron release. Total dissolved iron was analyzed spectrophotometrically (HACH method 8008). The analysis of sulfate ($SO_4^{2-}$) using ion chromatography (Dionex DX-500 equipped with an AS4A-SC column), in addition to Fe release, was performed on some lipid-pyrite suspensions. In these experiments it was expected that the results of Fe and $SO_4^{2-}$ release, or suppression of release, should be similar. The control experiments had found similar Fe and $SO_4^{2-}$ release and therefore indicate that the reduction in $Fe^{3+}$ release into solution during pyrite oxidation is due to the lipid impeding the pyrite oxidation process and not due to some sort of lipid complexation with aqueous $Fe^{3+}$.

RESULTS AND DISCUSSION

Figure 4A:
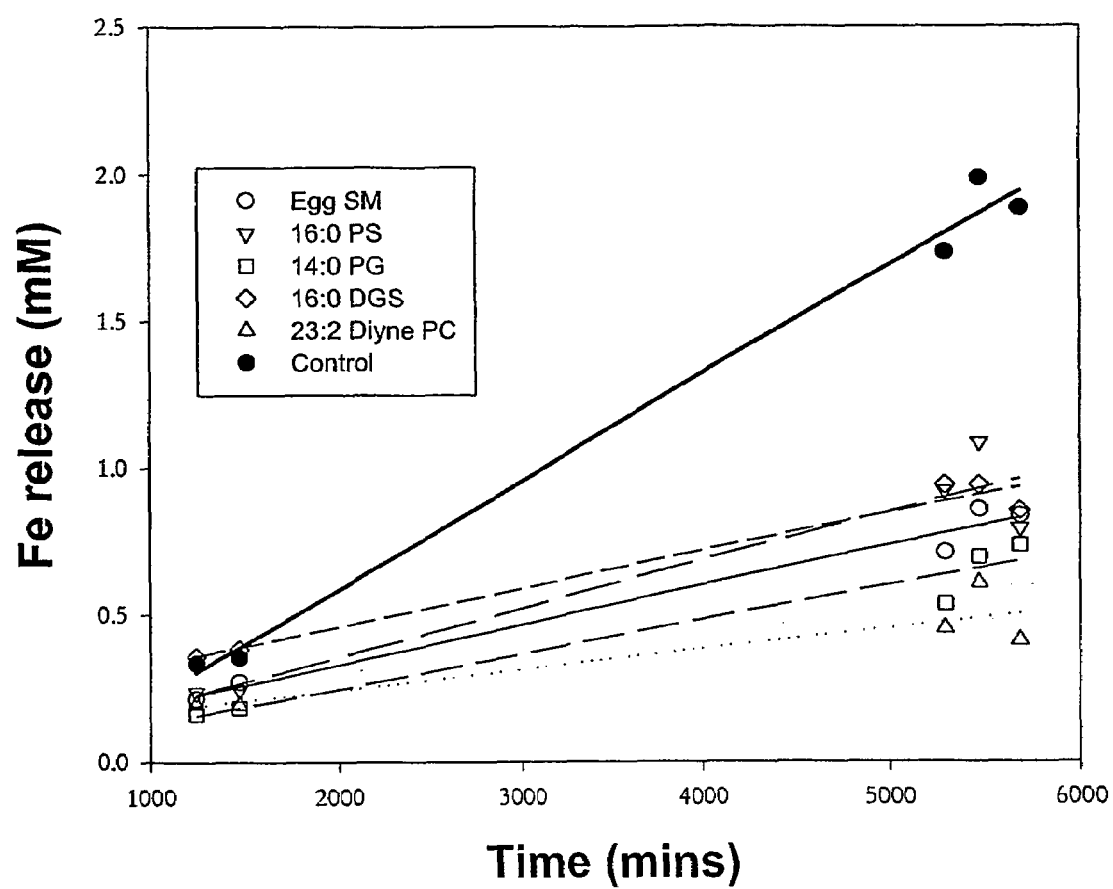
FIG. 4a is a graph illustrating the Fe release as a function of time for pyrite in water (control experiment) and in the presence of various two-tail lipid compounds.
Figure 4B:
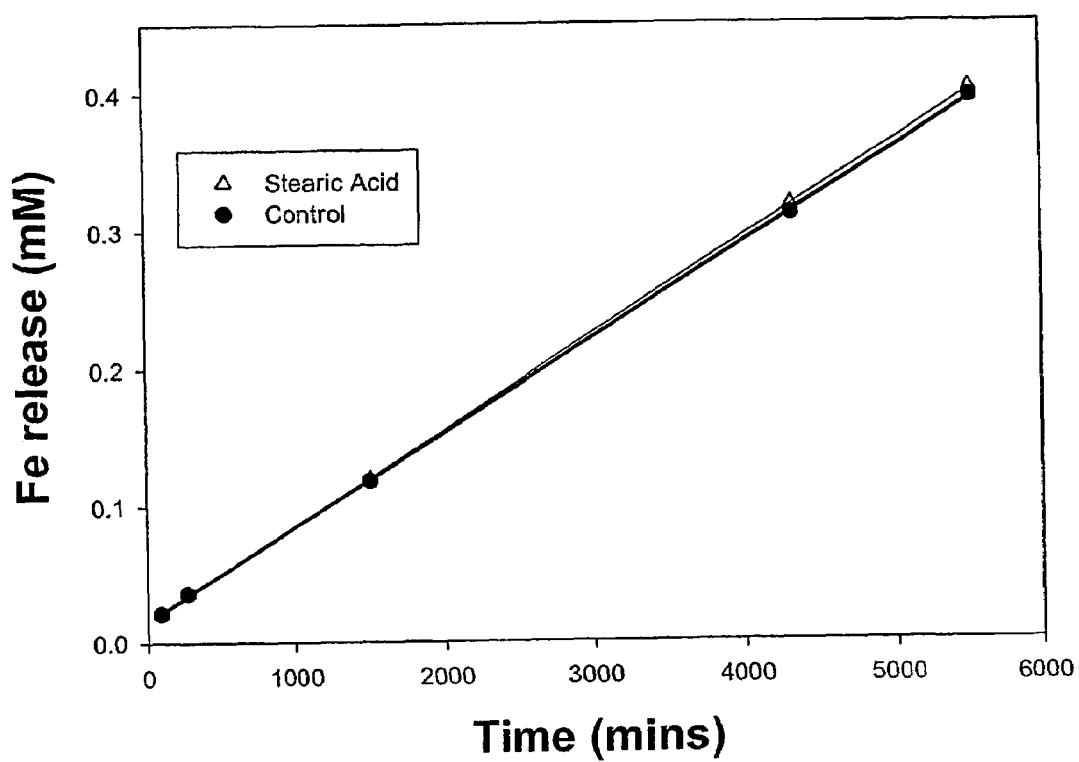
FIG. 4b is a graph illustrating the Fe release as a function of time for pyrite in the presence of one-tail lipid compound, stearic acid, obtained at a pH of 2.

Data obtained by determining the rate of Fe release as a function of time for each bilayer forming lipid solution under oxidizing conditions as compared to the control experiment are exhibited in FIG. 4a. The effect of the single tail lipid, stearic acid, compared to the control experiment is shown in FIG. 4b. Assuming that the slope of each plot is proportional to the rate of pyrite oxidation, the extent to which each solute suppresses oxidation can be determined relative to the pyrite in the absence of lipid (i.e., denoted as control pyrite in each plot). The results of this analysis are set forth in Table 1.

TABLE 1

| Ex./Comp. Ex. | Lipid | Moles of Lipid (μmol) | Suppression Percentage |
|---|---|---|---|
| 1 | Egg SM | 30 | 63% |
| 2 | 16:0 PS | 30 | 55% |
| 3 | 14:0 PG | 30 | 70% |
| 4 | 16:0 DGS | 30 | 65% |
| 5 | 23:2 Diyne PC | 30 | 81% |
| 6 | DSPC* | 3 | 67% |
| 7 | 18:0 PC* | 3 | 71% |
| A | None | N/A | 0% |
| B | Stearic Acid | 30 | 0% |

*Note that smaller amounts of DSPC and 18:0 PC were used than the other bilayer forming lipids, and experiments were run at pH 3.5 as opposed to pH 2

As the data show, with regard to the oxidation-inhibiting lipids the amount of pyrite oxidation suppression varied from 55% for the 16:0 PS lipid to 81% for the 23:2 Diyne PC. When comparing these results to those obtained for stearic acid, the addition of stearic acid showed no suppression of pyrite oxidation. Thus, the use of the bilayer-forming lipids as a coating for metal sulfides significantly inhibits the oxidation of the metal sulfides as compared to the use of a lipid having only a single hydrophobic tail (and which could not form a bilayer), which is entirely unexpected.

It is interesting to compare the behavior of the single-tailed stearic acid to the bilayer-forming lipids. Similar to the 16:0 DGS lipid (see FIG. 2), stearic acid might be expected to interact with the pyrite surface through a deprotonated COO⁻ group. However, the inability of stearic acid to exhibit any oxidation suppression at a pH of 2 suggests that this interaction is weak or protonation of the COO⁻ group at the pyrite surface leads to desorption into the solvent phase. The strong suppression exhibited by 16:0 DGS is supportive of its ability to form a bilayer on the pyrite surface even though it is insoluble in the water phase. A relatively densely packed bilayer might be expected to protect the electrophilic head group (in this case COO⁻) bonding to the pyrite surface.

It is also noteworthy that both DSPC and 18:0 PC were used at concentrations that were a factor of 10 lower than the five other lipids and showed a similar suppression on pyrite oxidation as the other lipids at higher concentration. These lipids were also tested at a pH of 3.5, as opposed to a pH of 2, and again showed similar suppression as the other lipids.

In the DSPC experiment and in the comparative example using stearic acid, the solutions were also analyzed for sulfate release in addition to iron release. Determination of the pyrite oxidation rate by either reaction parameter gave results that agreed within 1–5%. This particular finding further supports the theory that the adsorbed lipid layer is not interfering with being able to accurately measure the rate of pyrite oxidation.

In the examples, the preparation of the lipid was carried out in water without the presence of an organic solvent, which is necessary for the complete dissolution of some of the two-tail lipids used in this study. On the basis of the results, even in the water environment where the two-tail lipid is not solvated, there is an interaction between the lipid and the pyrite particulate that forms an adsorbed phase. It is believed that the pyrite surface allows the assembly of a lipid protective layer on the pyrite. Whether the lipid assembled into a bilayer is somewhat ambiguous, but such a layer might be expected to form, since the hydrophobic tails of the lipid would still need to be isolated from the aqueous phase. It is expected that the polar head group of the lipid undergoes the direct interaction with the mineral surface as schematically shown in FIG. 2. Previous work has shown that pyrite has surface charge properties that enable it to interact with a variety of low-molecular weight organic compounds, regardless of the formal charge of the compound (See, e.g., Bebie et al., "Pyrite surface interaction with selected organic aqueous species under anoxic conditions", Geochemical Transactions, Vol. 4 (2000)). Reactants interact with specific thiol or iron surface sites rather than by overall surface electrostatic forces. Metal-sulfides other than pyrite exhibit a similar surface charge development and should, in the same way, interact with any organic aqueous species (See, e.g., Bebie et al., "Surface charge development on transition metal sulfides: an electrokinetic study", Geochimica et Cosomochimica Acta, Vol. 62, pp. 633–642 (1998)). It is suspected that through this specific site charge interaction that any lipid head group interacts with the pyrite surface. It is expected that the same selective interaction would operate when lipids are exposed to other metal sulfides. This initial interaction would provide the appropriate interaction, leading to the formation of the bilayer.

SUMMARY

The foregoing results illustrate that two-tail lipid coatings significantly inhibit the oxidation of pyrite under environmentally relevant conditions. At a pH of 2 the amount of suppression was as high as 80%. The use of a single tail (non-bilayer forming) lipid such as stearic acid however showed no significant effect on pyrite oxidation. These results are entirely unexpected and it is believed that the two-tail lipid coatings form a densely packed structure, believed to be a bilayer, on the pyrite that inhibits the access of the sulfide surface to water and oxygen.

In summary, numerous benefits result from employing the concepts of the present invention. More particularly, an economical and effective method for preventing oxidation of metal sulfides including pyrite, as a result of reaction with oxygen and water in the environment is provided. As a result, these compounds may be disposed of in a more environmentally safe manner. In particular, a strong and stable protective lipid coating is provided on the metal sulfides such as pyrite/marcasite. This coating shields the metal sulfide from contact with the oxidizing agents in the environment that would otherwise lead to the formation of acid solutions enriched with heavy metals. As a result of the present method, a very significant cause of environmental problems has been addressed in a more effective manner than possible in prior art approaches. Accordingly, the present invention represents a significant advance in the art of controlling this type of environmental pollution. In conclusion, the foregoing results show that the bilayer-forming lipids show ability for helping to alleviate the detrimental effects of AMD on the environment.

Although the invention has been described in its preferred form with a certain degree of particularity, obviously many changes and variations are possible therein and will be apparent to those skilled in the art after reading the foregoing description. For example, the coatings of the present invention may also be useful as a water repellent and/or corrosion protective coating when applied to surface that come into contact with water and oxygen such as wood decks, wood or metal railings, wood or metal fences and the like. It is therefore to be understood that the present invention may be presented otherwise than as specifically described herein without departing from the spirit and scope thereof.

What is claimed is:

1. A method for inhibiting the oxidation of metal sulfide-containing material comprising the step of contacting the metal sulfide-containing material with an effective amount of an oxidation-inhibiting lipid coating comprising a lipid composition comprising one or more two-tail lipid compounds having hydrophilic head groups and two of the same or different hydrophobic groups attached to each of the hydrophilic head groups dispensed in an aqueous medium to inhibit oxidation of the metal sulfide-containing material.

2. The method of claim 1 wherein the metal sulfide-containing material is ore mine waste rock and/or metal sulfide tailings.

3. The method of claim 1 wherein the metal sulfide of the metal sulfide-containing material is selected from the group consisting of pyrite, marcasite and mixtures thereof.

4. The method of claim 1 wherein the hydrophilic head group of the lipid compound is selected from the group consisting of $-PO_4^{2-}$, $-PO_4^-$, $-PO_3^{2-}$, $-SO_4^{2-}$, $-NH_2$, $-NH_3^+$, primary amines, secondary amines, tertiary amines, $-CO_2^-$, $-OH^-$, carbonyl functional groups, acyl functional groups and combinations thereof.

5. The method of claim 1 wherein the two hydrophobic groups are attached to the hydrophilic head group of the lipid compound by an ether or ester bond.

6. The method of claim 5 wherein the two hydrophobic groups of the lipid compound are hydrocarbon chains having from about 10 to about 24 carbon atoms.

7. The method of claim 1 wherein the two hydrophobic groups of the lipid compound are hydrocarbon chains having from about 10 to about 24 carbon atoms.

8. The method of claim 1 wherein the lipid compound is selected from the group consisting of phospholipids, sphingolipids, glycolipids and combinations thereof.

9. The method of claim 8 wherein the phospholipids are selected from the group consisting of phosphatidylcholine, phosphatidylethanolamine, phosphatidic acid, phosphatidylinositol, and sphingomyelin.

10. The method of claim 1 wherein the lipid compound is selected from the group consisting of diacyl glycerol, phosphatidyl ethanolamine (PE), disteroylaminopropanediol (DS), phosphatidylglycerol (PG), distearyl phosphatidylcholine (DSPC), Egg Sphingomyelin, 1,2-Dipalmitoyl-SN-Glycero-3-[Phospho-L-Serine] (16:0 PS) 1,2,-Dimyristoyl-SN-Glycero-3-[Phospho-RAC-(1-Glycerol)] (16:0 DGS), 1,2-bis(10,12-tricosadiynoyl)-SN-Glycero-3-Phosphocholine (23:2 Diyne PC) and 1,2-Di-O-Octadecyl-SN-Glycero-3-Phosphocholine (18:0 Diether PC).

11. The method of claim 1 wherein the lipid compound is dispensed in water in a concentration of about 30 μmolar to about 30 milimolar.

12. The method of claim 11 wherein the lipid compound is selected from the group consisting of diacyl glycerol, phosphatidyl ethanolamine (PE), disteroylaminopropanediol (DS), phosphatidylglycerol (PG), distearyl phosphatidylcholine (DSPC), Egg Sphingomyelin, 1,2-Dipalmitoyl-SN-Glycero-3-[Phospho-L-Serine] (16:0 PS) 1,2,-Dimyristoyl-SN-Glycero-3-[Phospho-RAC-(1-Glycerol)] (16:0 DGS), 1,2-bis(10,12-tricosadiynoyl)-SN-Glycero-3-Phosphocholine (23:2 Diyne PC) and 1,2-Di-O-Octadecyl-SN-Glycero-3-Phosphocholine (18:0 Diether PC).

13. A method for treating acid mine drainage comprising the step of contacting a material causing the acid mine drainage with an effective amount of an oxidation-inhibiting lipid coating comprising a lipid composition comprising one or more lipid compounds having hydrophilic head groups and two of the same or different hydrophobic groups attached to each of the hydrophilic head groups dispensed in an aqueous medium.

14. The method of claim 13 wherein the material causing acid mine drainage is a metal sulfide-containing material.

15. The method of claim 14 wherein the metal sulfide-containing material is ore mine waste rock and/or metal sulfide tailings.

16. The method of claim 14 wherein the metal sulfide of the metal sulfide-containing material is selected from the group consisting of pyrite, marcasite and mixtures thereof.

17. The method of claim 13 wherein the hydrophilic head group of the lipid compound is selected from the group consisting of $-PO_4^{2-}$, $-PO_4^-$, $-PO_3^{2-}$, $-SO_4^{2-}$, $-NH_2$, $-NH_3^+$, primary amines, secondary amines, tertiary amines, $-CO_2^-$, $-OH^-$, carbonyl functional groups, acyl functional groups and combinations thereof.

18. The method of claim 13 wherein the two hydrophobic groups are attached to the hydrophilic head group by an ether or ester bond.

19. The method of claim 18 wherein the two hydrophobic groups attached to the hydrophilic head group are two hydrocarbon chains having from about 10 to about 24 carbon atoms.

20. The method of claim 13 wherein the two hydrophobic groups attached to the hydrophilic head group of the lipid compound are two hydrocarbon chains having from about 10 to about 24 carbon atoms.

21. The method of claim 13 wherein the lipid compound is selected from the group consisting of phospholipids, sphingolipids, glycolipids and combinations thereof.

22. The method of claim 21 wherein the phospholipids are selected from the group consisting of phosphatidylcholine, phosphatidylethanolamine, phosphatidic acid, phosphatidylinositol, and sphingomyelin.

23. A metal sulfide-containing material having an oxidation inhibiting lipid coating on at least a portion thereof, the lipid coating comprising a lipid composition comprising one or lipid compounds having hydrophilic head groups and two of the same or different hydrophobic groups attached to each of the hydrophilic head groups dispensed in an aqueous medium.

24. The coated metal sulfide of claim 23 wherein the hydrophilic head group of the lipid compound is selected from the group consisting of $-PO_4^{2-}$, $-PO_4^-$, $-PO_3^{2-}$, $-SO_4^{2-}$, $-NH_2$, $-NH_3^{30}$, primary amines, secondary amines, tertiary amines, $-CO_2^-$, $-OH^-$, carbonyl functional groups, acyl functional groups and combinations thereof.

25. The coated metal sulfide of claim 23 wherein the two hydrophobic groups are attached to the hydrophilic head group by an ether or ester bond.

26. The coated metal sulfide of claim 25 wherein the two hydrophobic groups attached to the hydrophilic head group are two hydrocarbon chains having from about 10 to about 24 carbon atoms.

27. The coated metal sulfide of claim 23 wherein the two hydrophobic groups attached to the hydrophilic head group of the lipid compound are two hydrocarbon chains having from about 10 to about 24 carbon atoms.

28. The coated metal sulfide of claim 23 wherein the lipid compound is selected from the group consisting of phospholipids, sphingolipids, glycolipids and combinations thereof.

29. The coated metal sulfide of claim 28 wherein the phospholipids are selected from the group consisting of phosphatidylcholine, phosphatidylethanolamine, phosphatidic acid, phosphatidylinositol, and sphingomyelin.

30. The coated metal sulfide of claim 23 wherein the lipid compound is selected from the group consisting of diacyl glycerol, phosphatidyl ethanolamine (PE), disteroylaminopropanediol (DS), phosphatidylglycerol (PG), distearyl phosphatidylcholine (DSPC), Egg Sphingomyelin, 1,2-Dipalmitoyl-SN-Glycero-3-[Phospho-L-Serine] (16:0 PS)1,2,-Dimyristoyl-SN-Glycero-3-[Phospho-RAC-(1-Glycerol)] (16:0 DGS), 1,2-bis(10,12-tricosadiynoyl)-SN-Glycero-3-Phosphocholine (23:2 Diyne PC) and 1,2-Di-O-Octadecyl-SN-Glycero-3-Phosphocholine (18:0 Diether PC).

* * * * *

UNITED STATES PATENT AND TRADEMARK OFFICE
CERTIFICATE OF CORRECTION

| | | |
|---|---|---|
| PATENT NO. | : 7,153,541 B2 | Page 1 of 1 |
| APPLICATION NO. | : 10/497769 | |
| DATED | : December 26, 2006 | |
| INVENTOR(S) | : Alicia Elsetinow et al. | |

It is certified that error appears in the above-identified patent and that said Letters Patent is hereby corrected as shown below:

Title page, item 73 Assignee should read as follows:

-- The Research Foundation of State University of New York,
   Albany, New York -- and;
-- Temple University, Philadelphia, Pennsylvania --

Signed and Sealed this
Eighteenth Day of January, 2011

David J. Kappos
*Director of the United States Patent and Trademark Office*